(12) United States Patent
Thomson

(10) Patent No.: US 8,459,136 B1
(45) Date of Patent: Jun. 11, 2013

(54) SHIFTER DETENT PLATE FOR AUTOMATIC TRANSMISSION

(76) Inventor: Robert K. Thomson, Woodstock, IL (US)

( * ) Notice: Subject to any disclaimer, the term of this patent is extended or adjusted under 35 U.S.C. 154(b) by 506 days.

(21) Appl. No.: 12/848,326

(22) Filed: Aug. 2, 2010

Related U.S. Application Data

(60) Provisional application No. 61/230,333, filed on Jul. 31, 2009.

(51) Int. Cl.
*B60K 20/00* (2006.01)
*G05G 5/00* (2006.01)

(52) U.S. Cl.
USPC .................................... 74/473.23; 74/473.21

(58) Field of Classification Search
USPC ................. 74/473.1, 473.21, 473.24, 473.25, 74/473.3
See application file for complete search history.

(56) References Cited

U.S. PATENT DOCUMENTS

| | | | | |
|---|---|---|---|---|
| 3,515,012 A | * | 6/1970 | Adahan | 74/473.3 |
| 4,077,276 A | | 3/1978 | Knox | |
| 4,365,522 A | | 12/1982 | Kubota et al. | |
| 4,850,238 A | * | 7/1989 | Inoue | 74/473.15 |
| 5,277,077 A | * | 1/1994 | Osborn | 74/473.21 |
| 5,445,046 A | | 8/1995 | Kataumi et al. | |
| 6,282,974 B1 | * | 9/2001 | Kataumi et al. | 74/473.28 |
| 7,469,569 B2 | * | 12/2008 | Webb | 72/467 |
| 7,814,810 B2 | * | 10/2010 | Mitteer | 74/473.1 |

* cited by examiner

*Primary Examiner* — Justin Krause
(74) *Attorney, Agent, or Firm* — Eugene M. Cummings, P.C.

(57) ABSTRACT

An improved shifter detent plate to replace the stock shifter detent plate used in certain automatic transmissions equipped with horseshoe shifters to provide positive stops between gears during forward shifts, thereby allowing the user to manually shift through the gears of the automatic transmission without accidentally skipping a gear.

8 Claims, 4 Drawing Sheets

SHIFTER DETENT PLATE FOR AUTOMATIC TRANSMISSION

RELATED APPLICATION

This application claims the benefit of U.S. Provisional Application No. 61/230,333, filed Jul. 31, 2009.

FIELD OF THE INVENTION

The present invention relates generally to an improved shifter detent plate. More specifically, this invention relates to an improved shifter detent plate to replace the stock shifter detent plate(s) used in certain automatic transmissions equipped with horseshoe shifters to provide positive stops between gears during forward shifts, thereby allowing the user to manually shift through the gears of the automatic transmission without accidentally skipping a gear. In particular, preferred embodiments of the improved shifter detent plate are especially configured to replace the stock shifter detent plate used in the three-speed TH350/TH400 and the four-speed 4L60/4L80E/TH700R4/TH200R4 automatic transmissions equipped with horseshoe shifters, used in, for example, the 1968-1972 models of the Chevrolet Chevelle, El Camino, Camaro, Monte Carlo and Impala, made by General Motors.

DESCRIPTION OF THE PRIOR ART

The prior art to the present invention is a stock shifter detent plate used in a horseshoe shifter assembly for three-speed TH350/TH400 and four-speed 4L60/4/L80E/TH700R4/TH200R4 automatic transmissions built into, for example, the 1968-1972 models of the Chevrolet Chevelle, El Camino, Camaro, Monte Carlo, and Impala, made by General Motors.

As further described below, the prior art stock shifter detent plate has a series of distinct stepped cam surfaces for guiding a crossbar that is part of the horseshoe shift lever when moved in a linear forward or backward motion over the stepped cam surfaces. Each of the distinct stepped cam surfaces corresponds to certain operational positions of the shift lever and associated operational positions, i.e., gears, of the automatic transmission. Therefore, placing the crossbar at a selected one of the operational positions P, R, N, D, 3, 2 or 1, causes the automatic transmission to shift in the corresponding gear.

While the stock shifter detent plate further comprises a number of steps between cam surfaces to limit uninterrupted linear forward or backward movement, the particular arrangement of the cam surfaces in the prior art shifter detent plate does not prevent inadvertent up- and down-shifts between certain operational position of the automatic transmission.

OBJECTS OF THE INVENTION

Accordingly, it is an object of this invention to provide an improved shifter detent plate to replace the stock shifter detent plate(s) used in certain automatic transmissions equipped with horseshoe shifters to provide positive stops between gears during forward shifts, thereby allowing the user to manually shift through the gears of the automatic transmission without accidentally skipping a gear.

It is another object of this invention to provide an improved shifter detent plate to replace the stock shifter detent plate(s) used in certain automatic transmissions equipped with horseshoe shifters to provide positive stops between gears during forward shifts, while allowing for uninterrupted downward shifts.

These and other objects and advantages of this invention will be apparent from the detailed description and drawings. What follows is a preferred embodiment of the present invention. To assess the full scope of the invention the claims should be looked to as the preferred embodiment is not the only embodiment within the scope of the invention.

SUMMARY OF THE INVENTION

The disclosed invention achieves its objectives by providing an improved shifter detent plate. The present invention comprises an improved shifter detent plate to replace the stock shifter detent plate(s) used in certain automatic transmissions to provide positive stops between every gear thereby allowing the user to manually shift through the gears of the automatic transmission without accidentally skipping a gear.

In one aspect of the invention an improved shifter detent plate is disclosed. More particularly, the improved shifter detent plate is adapted for use in an automatic transmission, the improved shifter detent plate comprising: a forward stop surface; a backward stop surface; a plurality of lower cam surfaces disposed between said forward stop surface and said backward stop surface, whereby each one of said lower cam surfaces corresponds to a specific operational position of said automatic transmission; and an upper stop member, including an upper cam surface and an upper forward stop, whereby said upper cam surface, said backward stop surface and a portion of said plurality of lower cam surfaces together define a channel, the upper cam surface further being opposite to said portion of said plurality of lower cam surfaces.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
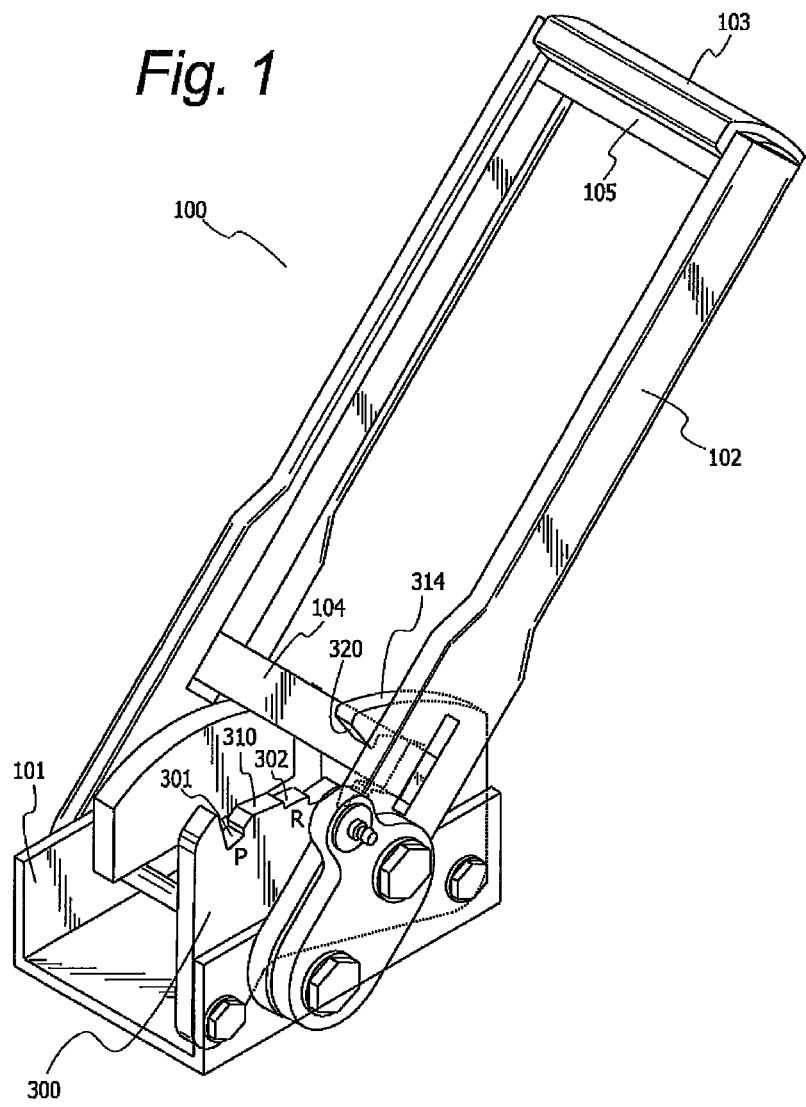
FIG. 1 shows a perspective view of a (partial) horseshoe shifter assembly including a preferred embodiment of the improved shifter detent plate.

Turning now to the Figures, FIG. 1 shows a representative (partial) horseshoe shifter assembly as it is used in connection with the three-speed TH350/TH400 and the four-speed 4L60/4L80E/TH700R4/TH200R4 automatic transmissions equipped with horseshoe shifters and used in, for example, the 1968-1972 models of the Chevrolet Chevelle, El Camino, Camaro, Monte Carlo and Impala, made by General Motors.

The representative horseshoe shifter assembly 100 shown in FIG. 1 is well known in the art and typically includes a base plate 101, stationary mounted to the vehicle body (not shown) and a u-shaped "horseshoe" shift lever 102, pivotally mounted to base plate 101. Shift lever 102 further comprises a handle portion 103 and a spring-mounted crossbar 104 which can be raised by pulling up on a trigger 105 typically mounted underneath handle portion 103, whereby pulling trigger 105 upwards compresses a spring-mechanism inside shift lever 102 causing crossbar 104 to be raised towards handle portion 103. FIG. 1 also shows a preferred embodiment of the improved shifter detent plate 300 mounted to base plate 101 so as to receive crossbar 104.

Figure 2:
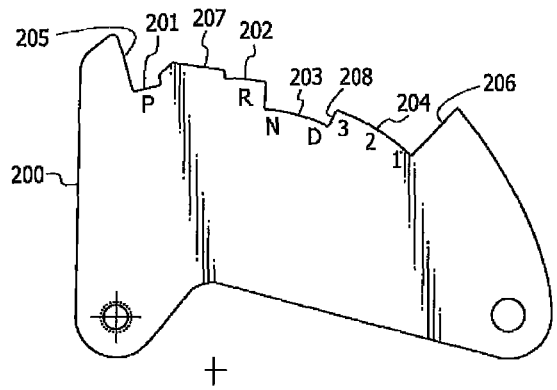
FIG. 2 shows a side view of a prior art shifter detent plate, in particular the stock shifter detent plate used in connection with the four-speed 4L60/4L80E/TH700R4/TH200R4 automatic transmissions equipped with a horseshoe shifter.

FIG. 2 shows a side view of a prior art shifter detent plate 200, in particular the stock shifter detent plate used in connection with the four-speed 4L60/4L80E/TH700R4/TH200R4 automatic transmission equipped with a horseshoe shifter. For the following explanation, although not shown, it is assumed that stock shifter detent plate is mounted as part of the shifter assembly shown in FIG. 1, whereby stock shifter detent plate 200 takes the place of improved shifter detent plate 300. Stock shifter detent plate 200 has a series of distinct stepped cam surfaces 201, 202, 203, and 204, for guiding crossbar 104 when moved in a linear forward or backward motion over the stepped cam surfaces. Each of the distinct stepped cam surfaces corresponds to certain operational positions of shift lever 102 and associated operational positions, i.e., gears, of the automatic transmission. In the particular detent plate of FIG. 2, cam surface 201 corresponds to the park (P) position, cam surface 202 corresponds to the reverse-drive (R) position, cam surface 203 corresponds to the neutral (N) and forward-drive (D) positions, and cam surface 204 corresponds to the forward drive positions third gear (3), second gear (2) and first gear (1). Therefore, placing crossbar 104 at a selected one of the operational positions P, R, N, D, 3, 2 and 1, causes the automatic transmission to shift in the corresponding gear.

Stock shifter detent plate 200 further comprises forward stop 205 and backward stop 206, which prevent crossbar 104 from further linear forward or backward movement past cam surface 201 and cam surface 204, respectively. In addition, stock shifter detent plate 200 comprises a lower positive stop 207 between cam surfaces 201 and 202 to prevent inadvertent movement of crossbar 104 between operational position P and R. In order to move crossbar 104 between cam surface 201 and cam surface 202, in either direction, the user must raise crossbar 104 by pulling trigger 105 upwards allowing crossbar 104 to clear lower stop 207 when shift lever 102 is moved between cam surfaces 201 and 202. To be clear, unless spring-mounted crossbar 104 is manually raised by the user by pulling trigger 105, the constant downward force of the spring (not shown, but well known in the art) causes crossbar 104 to push downward and engage the cam surface, "riding" over the different cam surfaces until further movement is stopped by forward stop 205, backward stop 206, positive lower stop 207 or the steps between cam surfaces 202, 203 and 204.

The stepped arrangement of cam surfaces 202, 203 and 204, as shown in FIG. 2, allows for uninterrupted forward-movement of spring-mounted crossbar 104 from cam surface 204 to cam surface 203 (providing for uninterrupted up-shifts from first gear (1) to forward-drive (D), whereby the spring mechanism inside shift lever 102 causes the spring-mounted crossbar to drop from cam surface 204 over step 208 onto lower cam surface 203 without requiring the user to raise crossbar 104. However, continued forward movement of crossbar 104 to higher cam surface 202 requires the user to raise crossbar 104 to clear the step between upper cam surface 202 and lower cam surface 203. Conversely, moving crossbar 104 backwards from cam surface 203 to cam surface 204 (to perform a downshift from forward-drive (D) to any of third (3), second (2), or first (1) gear), requires the user to raise crossbar 104 to clear step 208 between lower cam surface 203 and upper cam surface 204.

Figure 3:
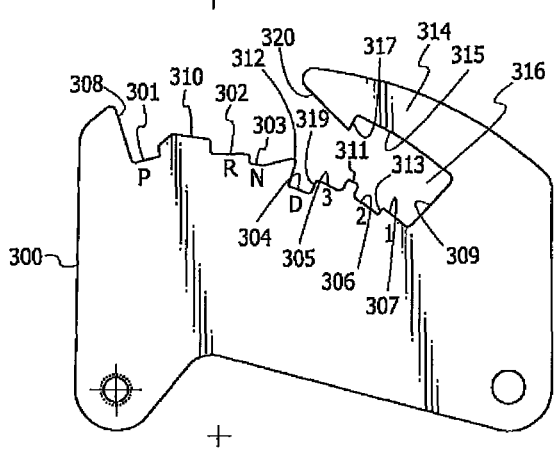
FIG. 3 shows a side view of a preferred embodiment of the improved shifter detent plate, in particular the improved shifter detent plate configured to replace the stock shifter detent plate used in connection with the four-speed 4L60/4L80E/TH700R4/TH200R4 automatic transmissions equipped with a horseshoe shifter.

Referring now to FIG. 3, FIG. 3 shows a preferred embodiment of the improved shifter detent plate 300 and in particular the improved shifter detent plate 300 configured to replace the stock shifter detent plate 200, previously referred to with reference to FIG. 2. Improved shifter detent plate 300 is a preferred embodiment especially adapted to be used in connection with the four-speed 4L60/4L80E/TH700R4/TH200R4 automatic transmissions equipped with a horseshoe shifter. Improved shifter detent plate 300 is preferably made out of a rigid metal material, such as, for example, steel or aluminum. For the following explanation, reference is made to FIGS. 1 and 3. Similar to stock shifter detent plate 200, improved shifter detent plate 300 has a series of distinct stepped lower cam surfaces 301, 302, 303, 304, 305, 306, and 307, for guiding crossbar 104 when moved in a linear forward or backward motion over the stepped cam surfaces.

Each of the stepped lower cam surfaces corresponds to certain operational positions of shift lever 102 and associated operational positions, i.e., gears, of the automatic transmission. With regard to improved shifter detent plate 300, cam surface 301 corresponds to the park (P) position, cam surface 302 corresponds to the reverse-drive (R) position, cam surface 303 corresponds to the neutral (N) position, cam surface 304 corresponds to the forward-drive (D) position, cam surface 305 corresponds to the forward-drive third gear (3) position, cam surface 306 corresponds to the forward-drive second gear (2) position, and cam surface 307 corresponds to the forward-drive first gear (1) position. Improved shifter detent plate 300 further comprises forward stop 308 and backward stop 309, which prevent crossbar 104 from further linear forward or backward movement past cam surface 301 and cam surface 307, respectively.

In addition, and unlike the prior art stock shifter detent plate 200, improved shifter detent plate 300 comprises an additional lower positive stop 311. In addition to lower positive stop 310 between cam surfaces 301 and 302 to prevent inadvertent movement of crossbar 104 between operational positions park (P) and reverse-drive (R), improved shifter detent plate 300 also comprises a lower positive stop 311 between cam surfaces 305 and 306 to prevent inadvertent movement of crossbar 104 between operational positions third (3) gear and second (2) gear. In order to move crossbar 104 between cam surfaces 301 and 302, or between cam surfaces 305 and 306, in either direction, the user must raise crossbar 104 to clear the lower positive stops 310 and 311 respectively. Thus, lower positive stop 311 prevents inadvertent down-shifts from third gear into second gear or inadvertent up-shifts from second gear into third gear.

A further improvement over prior art shifter detent plate 200 is the increased number of distinct stepped cam surfaces by adding additional steps to improved shifter detent plate 300. In particular, cam surfaces 303 and 304 are separated by additional step 312 to prevent inadvertent shifting from drive (D) into neutral (N) without raising crossbar 104. Cam surfaces 306 and 307 are separated by additional step 313 to prevent inadvertent down-shifting from second (2) gear into first (1) gear.

Preferably shifter detent plate also includes upper stop member 314, which, together with lower cam surfaces 305, 306, 307, backward stop 309 and upper cam surface 315, forms channel 316. It should be noted that channel 316 must be dimensioned to provide enough clearance to allow crossbar 104 to clear lower stop 311 when lifted up. In other words, if crossbar 104 is raised until it touches upper cam surface 315, there must be enough space to clear lower stop 311. Upper stop member 314 in combination with lower positive stop 311 and upper forward stop 317 provides an improved arrangement for enabling a user to manually shift through the gears of the automatic transmission without inadvertently skipping a gear, or inadvertently shifting from one gear to another.

The following describes in detail the manual shifting procedure utilizing the improved shifter detent plate 300 as part of the shifter assembly shown in FIG. 1. To shift from first into second gear, the user simply pushes shift lever 102 (and thereby crossbar 104) forward without raising crossbar 104, thereby causing spring-mounted crossbar 104 to drop from cam surface 307 over step 313 down to cam surface 306, until crossbar 104 hits lower stop 311. Once crossbar 104 is positioned over cam surface 306, it cannot be moved forward to cam surface 305 or backward to cam surface 307, without first raising crossbar 104 to either clear lower stop 311 or step 113, respectively.

To shift from second gear into third gear, the user first raises up crossbar 104 to clear lower stop 311, then pushes forward until crossbar 104 hits upper forward stop 317. When crossbar 104 hits upper forward stop 317 the user releases spring-mounted crossbar 104 causing it to drop down onto cam surface 305, i.e., third gear. Once crossbar 104 is positioned over cam surface 305, it cannot be moved back to cam surface 306 without first raising crossbar 104 to clear lower stop 311.

To shift from third gear into forward-drive (D), the user simply pushes shift lever 102 (and thereby crossbar 104) forward, thereby causing spring-mounted crossbar 104 to drop from cam surface 305 over step 119 down to cam surface 304, until crossbar 104 hits step 312. Once crossbar 104 is positioned over cam surface 304, it cannot be moved forward to cam surface 303 or backward to cam surface 305 without raising crossbar 104 to either clear step 312 or step 319, respectively.

To shift from forward-drive (D) into neutral (N), the user, as with the prior art shifter detent plate 200, first raises crossbar 104 to clear step 312. However, unlike the prior art, the user also raises crossbar 104 when down-shifting from forward-drive (D) into third gear, to clear step 319. The remaining shifts, i.e., the shifts between the positions neutral (N), reverse-drive (R) and park (P) are identical to the shifts utilizing the prior art shifter detent plate 200 (see above).

Preferably, upper stop member 314 of improved shifter detent plate 300 also includes beveled edge 320, which guides crossbar 104, while being raised by the user, when it is moved towards backward stop 309 (i.e., during "down-shifts") beginning at any of the positions park (P), reverse-drive (R), neutral (N), forward-drive (D) and third (3) gear. In other words, while crossbar 104 is positioned over any of cam surfaces 301, 302, 303, 304 or 305, the user raises crossbar 104 by pulling trigger 105 upwards and while keeping trigger 105 pulled upwards with light upward finger pressure, moving shift lever 102 together with crossbar 104 backward towards backward stop 309. During such movement (and under continued light upward finger pressure against trigger 105), spring-mounted crossbar 104 will trace beveled edge 320 downwards until it passes upper forward stop 317, causing crossbar 104 to snap up against upper cam surface 315 and continues to trace upper cam surface 315 until crossbar 104 hits backward stop 309. Thus, beveled edge 320 and upper cam surface 315 are designed to preserve the down-shift "feel" of the original stock shifter detent plate 200 by providing for uninterrupted down-shifts in one smooth motion. But for beveled edge 320 and upper cam surface 315 the user would have to raise crossbar 104 over every lower stop and step, in particular, lower stop 312, step 319, lower stop 311 and step 313.

In addition, stop 312 has an integrated beveled edge or "ramp" which begins at cam surface 303 (N) and slopes upwards away from cam surface 303 towards cam surface 304. This particular design preserves the "feel" of the original stock shifter detent plate 200, by enabling a user to shift from reverse-drive (R) or neutral (N) into forward-drive (D) without having to raise crossbar 104. As shown in FIG. 2, stock shifter detent plate 200 does not have a lower stop between the positions neutral (N) and forward-drive (D) allowing for uninterrupted shifts between these two positions. However, since improved shifter detent plate 300 includes lower stop 312 to provide a positive stop when shifting from forward-drive (D) into neutral (N), the particular beveled edge design of stop 312, as shown in FIG. 3, forces spring-mounted crossbar 104 to trace the beveled edge of stop 312 upwards until crossbar 104 drops down onto cam surface 304 when crossbar 104 is moved backwards towards backward stop 309 without requiring the user to raise crossbar 104 over stop 312.

Figure 4:
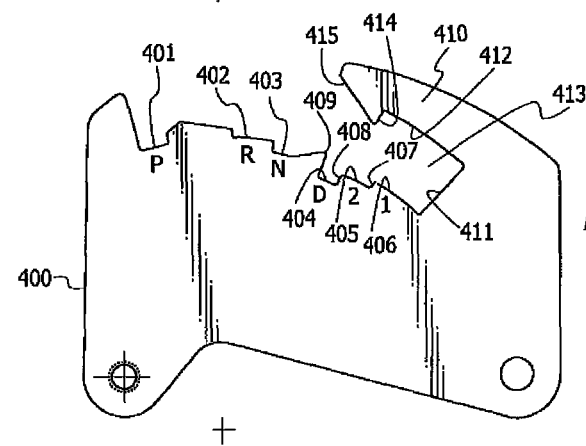
FIG. 4 shows a side view of a preferred embodiment of the improved shifter detent plate, in particular a preferred embodiment of the improved shifter detent plate configured to replace the stock shifter detent plate used in connection with the three-speed TH350/TH400 automatic transmissions equipped with a horseshoe shifter.
Figure 5:
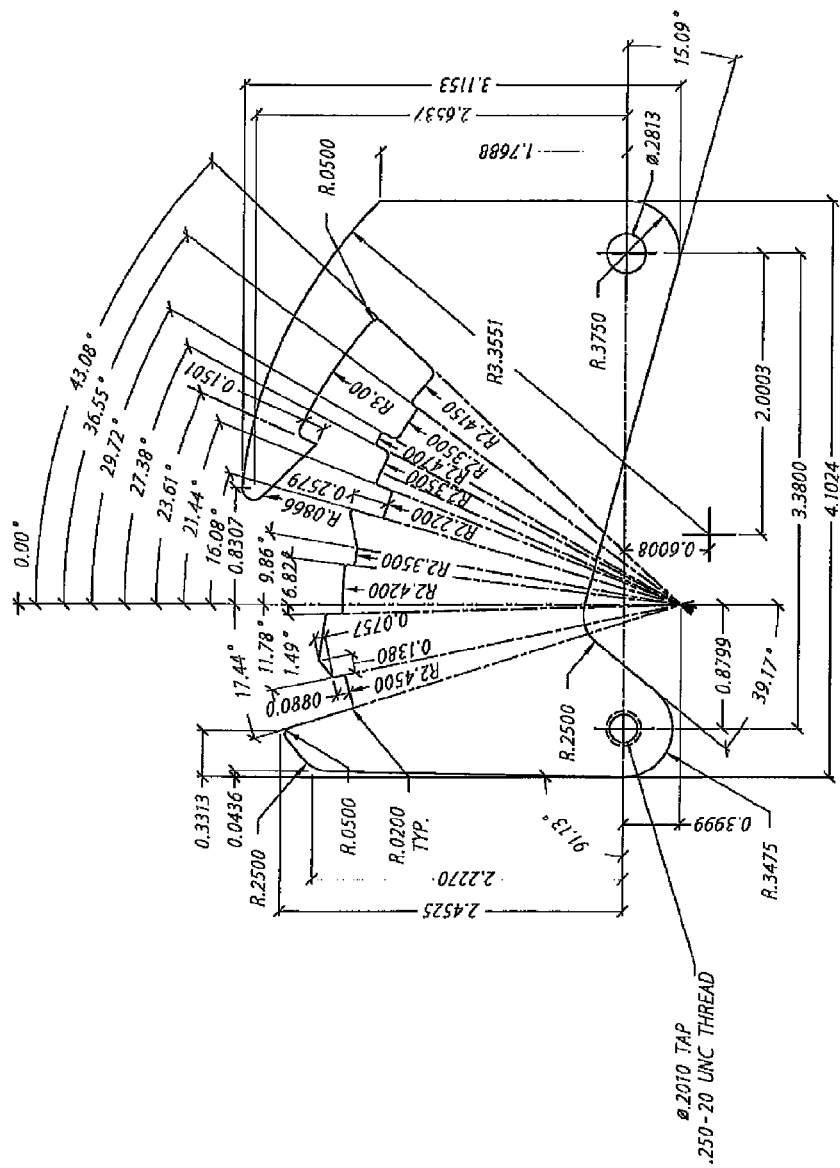
Figure 6:
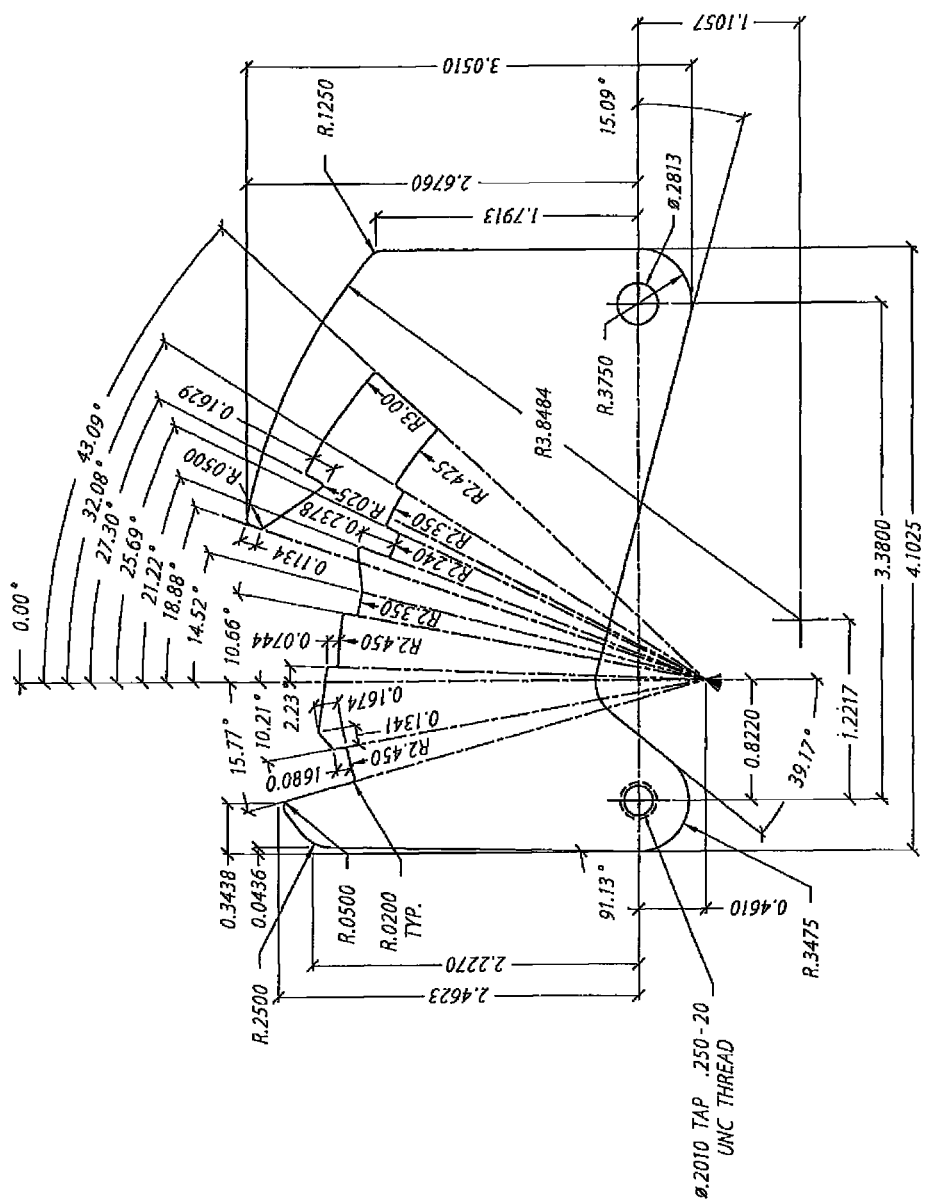

Referring now to FIG. 4, FIG. 4 shows another preferred embodiment an improved shifter detent plate and in particular improved shifter detent plate 400 configured to replace the stock shifter detent plate 200, previously referred to with reference to FIG. 2. Improved shifter detent plate 400 is a preferred embodiment especially adapted to be used in connection with the three-speed TH350/TH400 automatic transmissions equipped with a horseshoe shifter. Improved shifter detent plate 400 is preferably made out of a rigid metal material, such as, for example, steel or aluminum. For the following explanation, reference is made to FIGS. 1 and 4, whereby the embodiment of improved shifter detent plate 400 takes the place of improved shifter detent plate 300. Similar to shifter detent plate 300, improved shifter detent plate 400 has a series of distinct stepped lower cam surfaces 401, 402, 403, 404, 405, and 406, for guiding crossbar 104 when moved in a linear forward or backward motion over the stepped cam surfaces. Shifter detent plate 400 is basically identical to shifter detent plate 300 described above. The only differences stem from the fact that shifter detent plate 400 is especially adapted for a three-speed automatic transmission. The following description will, therefore, only address the specific differences as they pertain to shifter detent plate 400.

To shift from first into second gear, the user, simply pushes shift lever 102 (and thereby crossbar 104) forward without raising crossbar 104, thereby causing spring-mounted crossbar 104 to drop from cam surface 406 over step 407 down to cam surface 405. To shift from second gear into forward-drive (D), the user simply pushes shift lever 102 (and thereby crossbar 104) forward, thereby causing spring-mounted crossbar 104 to drop from cam surface 405 over step 408 down to cam surface 404, until crossbar 104 hits step 409. Once crossbar 104 is positioned over cam surface 404, it cannot be moved forward to cam surface 403 or backward to cam surface 405 without raising crossbar 104 to either clear step 409 or step 408, respectively. The increased number of distinct stepped cam surfaces (cam surfaces 403, 404, 405 and 406) are an improvement over prior art shifter detent plate 100. In particular, cam surfaces 404 and 403 are separated by additional step 409 to prevent inadvertent shifting from drive (D) into neutral (N) without raising crossbar 104. Cam surfaces 405 and 406 are separated by additional step 407 to prevent inadvertent down-shifting from second (2) gear into first (1) gear.

However, in the preferred embodiment of shifter detent plate 400, there is no lower positive stop between cam surface 405 (second gear) and cam surface 404 (D) comparable to lower stop 311 in shifter detent plate 300 as shown in FIG. 3. Therefore, by default, the embodiment of shifter detent plate 400 provides for uninterrupted forward shifts from first gear (cam surface 406) to forward-drive (cam surface 404), without requiring the user to raise crossbar 104 and thereby leaving the (up-) shift pattern (from first gear to forward-drive) of prior art stock shifter detent plate 200 unchanged.

Similar to the description of shifter detent plate 300, preferably shifter detent plate 400 includes upper stop member 410, which, together with lower cam surfaces 405, 406, backward stop 411 and upper cam surface 412, forms channel 413. As explained above, since shifter detent plate 400 does not have a positive lower stop, allowing a user to shift from first gear into forward-drive with one forward motion of shift lever 102, upper stop member 410 and upper forward stop 414 are critical for enabling a user, if so desired, to manually shift from first to second gear, without inadvertently shifting into forward drive (D).

Therefore, if the user wants to make sure that he or she only shifts from first gear into second gear, the user, when crossbar 104 is positioned over cam surface 406 (first gear), first raises crossbar 104 until it contacts upper cam surface 412, then pushes shift lever 102 forward until crossbar 104 hits upper forward stop 414. When crossbar 104 hits upper forward stop 414 the user releases spring-mounted crossbar 104 causing it to drop down onto cam surface 405, i.e., second gear.

Preferably, upper stop member 410 of improved shifter detent plate 400 also includes beveled edge 415, which guides crossbar 104, while being raised by the user, when it is moved towards backward stop 411 (i.e., during "down-shifts") beginning at any of the positions park (P), reverse-drive (R), neutral (N), forward-drive (D) and second (2) gear. In other words, while positioned over any of cam surfaces 401, 402, 403, or 404, the user raises crossbar 104 by pulling trigger 105 upwards and while keeping trigger 105 pulled upwards with light upward finger pressure, moving shift lever 102 together with crossbar 104 backward towards backward stop 411, During such movement (and under continued light upward finger pressure against trigger 105), spring-mounted crossbar 104 will trace beveled edge 415 downwards until it passes upper forward stop 414, causing crossbar 104 to snap up against upper cam surface 412 and continues to trace upper cam surface 412 until crossbar 104 hits backward stop 411. Thus, beveled edge 415 and upper cam surface 412 are designed to preserve the down-shift "feel" of the original stock shifter detent plate 200 by providing for uninterrupted down-shifts in one smooth motion. But for beveled edge 415 and upper cam surface 412 the user would have to raise crossbar 104 over every lower stop and step, in particular, lower stop 409, step 408 and step 407.

In addition, stop 409 has an integrated beveled edge or "ramp" which begins at cam surface 403 (N) and slopes upwards away from cam surface 403 towards cam surface 404. As explained with reference to improved shifter detent plate 300 above, this particular design preserves the "feel" of the original stock shifter detent plate 200, by enabling a user to shift from reverse-drive (R) or neutral (N) into forward-drive (D) without having to raise crossbar 104. As shown in FIG. 2, stock shifter detent plate 200 does not have a lower stop between the positions neutral (N) and forward-drive (D) allowing for uninterrupted shifts between these two positions. However, since improved shifter detent plate 400 includes lower stop 409 to provide a positive stop when shifting from forward-drive (D) into neutral (N), the particular beveled edge design of stop 409, as shown in FIG. 4, forces spring-mounted crossbar 104 to trace the beveled edge of stop 409 upwards until crossbar 104 drops down onto cam surface 404 when crossbar 104 is moved backwards towards backward stop 411 without requiring the user to raise crossbar 104 over stop 409.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A shifter detent plate for use in an automatic transmission, comprising:
   (a) a forward stop surface;
   (b) a backward stop surface;
   (c) a plurality of lower cam surfaces disposed between the forward stop surface and the backward stop surface, whereby each one of the lower cam surfaces corresponds to a specific operational position of the automatic transmission, wherein:
   (1) a first lower cam surface corresponds to the position first gear,
   (2) a second lower cam surface corresponds to the position second gear,
   (3) a third lower cam surface corresponds to the position forward-drive,
   (5) a fourth lower cam surface corresponds to the position neutral,
   (6) a fifth lower cam surface corresponds to the position reverse-drive, and
   (7) a sixth lower cam surface corresponds to the position park; and wherein further:
      (i) a first step is disposed between the first lower cam surface and the second lower cam surface, the first lower cam surface being raised relative to the second lower cam surface,
      (ii) a second step is disposed between the second lower cam surface and the third lower cam surface, and
      (iv) a third step is disposed between the third lower cam surface and the fourth lower cam surface, the fourth lower cam surface being raised relative to the third lower cam surface; and
   (d) an upper stop member, including an upper cam surface and an upper forward stop, whereby the upper cam surface, the backward stop surface and a portion of the plurality of lower cam surfaces together define a channel, the upper cam surface further being opposite to the portion of the plurality of lower cam surfaces.

2. The shifter detent plate of claim 1, wherein the third step includes a beveled edge beginning at the fourth lower cam surface and sloped upwards away from the fourth lower cam surface.

3. The shifter detent plate of claim 1, wherein the upper stop member further comprises a beveled edge sloped downwards towards the upper forward stop, the upper forward stop being opposite to the second lower cam surface.

4. The shifter detent plate of claim 1, wherein the channel defined by the upper cam surface, the backward stop surface and a portion of the plurality of lower cam surfaces, is capable of receiving a spring-mounted crossbar.

5. A shifter detent plate for use in an automatic transmission, comprising:
   (a) a forward stop surface;
   (b) a backward stop surface;
   (c) a plurality of lower cam surfaces disposed between the forward stop surface and the backward stop surface, whereby each one of the lower cam surfaces corresponds to a specific operational position of the automatic transmission, wherein:
      (1) a first lower cam surface corresponds to the position first gear,
      (2) a second lower cam surface corresponds to the position second gear,
      (3) a third lower cam surface corresponds to the position third gear,
      (4) a fourth lower cam surface corresponds to the position forward-drive,
      (5) a fifth lower cam surface corresponds to the position neutral,
      (6) a sixth lower cam surface corresponds to the position reverse-drive, and
      (7) a seventh lower cam surface corresponds to the position park; and wherein further:
      (i) a first step is disposed between the first lower cam surface and the second lower cam surface, the first lower cam surface being raised relative to the second lower cam surface,
      (ii) a positive stop is protrudingly disposed between the second lower cam surface and the third lower cam surface,
      (iii) a second step is disposed between the third lower cam surface and the fourth lower cam surface, and
      (iv) a third step is disposed between the fourth lower cam surface and the fifth lower cam surface, the fifth lower cam surface being raised relative to the fourth lower cam surface; and
   (d) an upper stop member, including an upper cam surface and an upper forward stop, whereby the upper cam surface, the backward stop surface and a portion of the plurality of lower cam surfaces together define a channel, the upper cam surface further being opposite to the portion of the plurality of lower cam surfaces.

6. The shifter detent plate of claim 5, wherein the third step includes a beveled edge beginning at the fifth lower cam surface and sloped upwards away from the fifth lower cam surface.

7. The shifter detent plate of claim 5, wherein the upper stop member further comprises a beveled edge sloped downwards towards the upper forward stop, the upper forward stop being opposite to the third lower cam surface.

8. The shifter detent plate of claim 5, wherein the channel defined by the upper cam surface, the backward stop surface and a portion of the plurality of lower cam surfaces, is capable of receiving a spring-mounted crossbar.

* * * * *